United States Patent Office 2,973,661
Patented Mar. 7, 1961

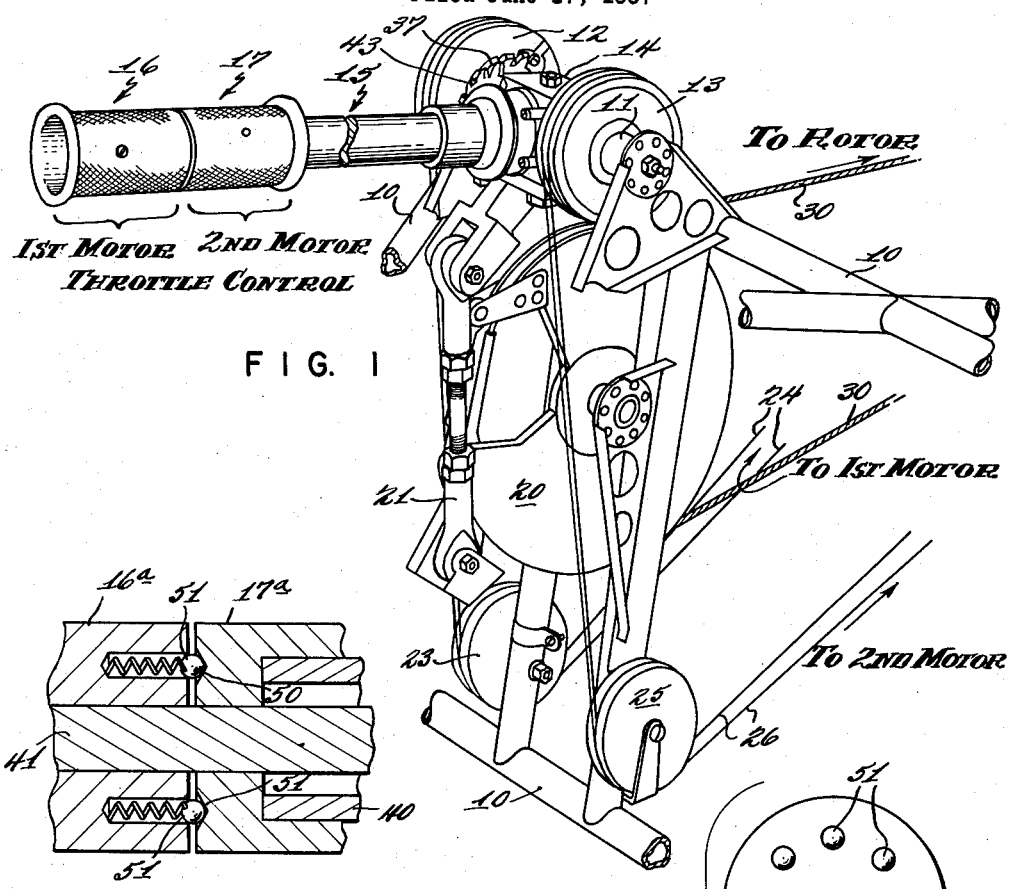
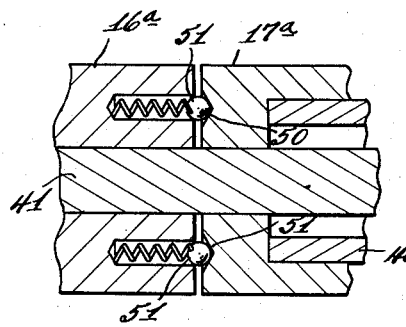
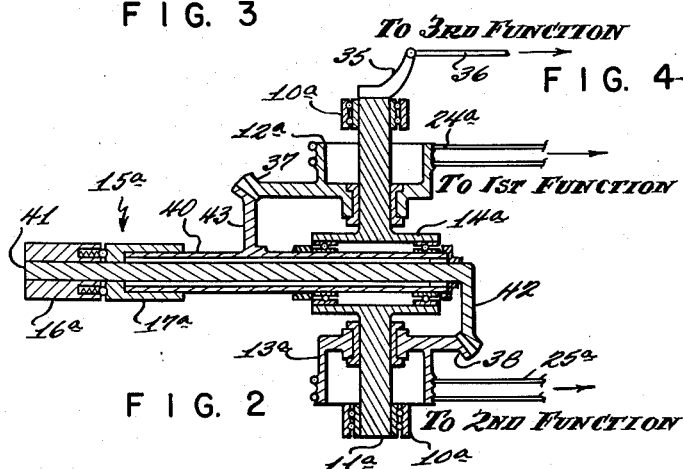
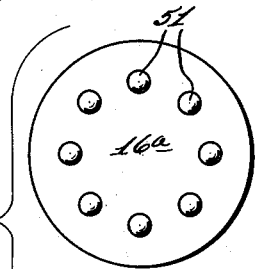
March 7, 1961    B. W. SZNYCER    2,973,661
SELECTIVE ADJUSTMENT CONTROL MECHANISM
Filed June 17, 1957
INVENTOR.
BERNARD W. SZNYCER
BY Mauro & Lewis
ATTY'S.

2,973,661
SELECTIVE ADJUSTMENT CONTROL MECHANISM

Bernard W. Sznycer, New York, N.Y., assignor to Omega Aircraft Corporation, New York, N.Y., a corporation of New York Filed June 17, 1957, Ser. No. 665,973

5 Claims. (Cl. 74—471)

This invention relates to a selective adjustment control mechanism wherein by a single implement, such as a pivoted lever, a plurality of functions may be selectively or concurrently adjusted.

In a helicopter of my design of the single rotor type, for which other applications for patent are copending, a machine is provided wherein lift and directional flight are accomplished by adjusting the collective pitch of the rotors and by applying cyclic pitch thereto. Separate means, such as a control stick, are employed to impart cyclic pitch to a swash plate which in turn conveys this adjustment to the rotors. In the helicopter of my design a pair of engines are each coupled to the single rotor shaft in such manner that when each engine is properly adjusted at the same r.p.m., each will share the driving force applied to the rotor shaft. Other means are provided, such as ratchet-jawed clutches, whereby either motor is automatically disconnected from the rotor shaft if it fails or lags behind the other motor, so that the latter may continue to operate the rotor shaft.

In such a helicopter, it being necessary to control cyclic pitch of the rotor by a separate lever mounted for rotary movement about a vertical axis, the specific object of this invention is to provide a single additional control such as a levered throttle, whereby with one hand the pilot may selectively and readily vary the throttle adjustments of either motor or both, or vary the throttle adjustments of both motors simultaneously with an adjustment of the collective pitch of the rotor. In a machine of the type described it will be understood that any substantial increase of throttle should be accompanied by a calculated increase in the collective pitch of the rotor, and vice versa.

In the specific embodiment of the invention shown in the drawing, a control stick or lever is shown wherein a pivoted arm is mounted for axial movement, which results in changed adjustments of all three functions (both motor throttles and collective pitch), and wherein a dual handle is provided, the segments whereof may be separately or simultaneously rotated to effect throttle adjustments for one or both motors without affecting change in the collective pitch of the rotor.

The applicability of the invention to functions of control other than to the requirements of the helicopter above described, will occur to those skilled in the art.

In the drawing:

Fig. 1 is a perspective view of the invention in the form of a control stick mechanism for a helicopter having dual engines;

Fig. 2 is a schematic view in section, in simplified form;

Fig. 3 is an enlarged fragmentary section through the juncture of the dual handle grips of the control lever; and Fig. 4 is an enlarged view of the profiles of the opposed ends of the handle segments seen in Fig. 3.

In Fig. 1, a suitable supporting frame for the control is shown fragmentarily at 10. This frame may be formed integrally with the cabin floor frame of a helicopter so that the control means is mounted adjacent the pilot's seat.

The upper portion of frame 10 contains bearings for a horizontal shaft 11 carrying pulleys 12 and 13 each also mounted in bearings for selective independent rotation with respect to shaft 11.

A central hub 14 is also mounted on shaft 11 for rotation therewith and connects to lever 15. Lever 15 carries at its extremity the dual throttle control handles 16 and 17. A pulley wheel 20 is journalled to frame 10 beneath shaft 11 and is connected to hub 14 by the adjustable linkage 21.

By means further to be described, control handle 17 is connected via pulley 12 and pulley 23 with pulley cables 24 leading to the throttle of a first motor. Control handle 16 is connected via pulley 13 and pulley 25 to pulley cables 26 leading to the throttle of a second motor. Movement of handle 15 on the axis of shaft 11 products adjustment both of pulleys 12 and 13 (and hence of pulley cables 24—26) as well as causing movement of hub 14, linkage 21 and pulley wheel 20, to which is connected pulley cable 30, leading to means for adjusting collective pitch in the rotor.

In Fig. 2, the invention is shown schematically in section in slightly modified form for purposes of simplicity. In Fig. 2, parts above described for Fig. 1 are identified by the same reference numerals followed by an "a" suffix.

Frame 10a carries shaft 11a in suitable bearings, and rotation thereof actuates bellcrank 35 and control rod 36, these elements being substituted in Fig. 2 for the pulley 20, linkage 21 and cable 30 of Fig. 1.

Shaft 11a supports pulleys 12a and 13a rotatively mounted thereon, connected to pulley cables 24a—25a, respectively. Formed integrally with pulleys 12a and 13a are gear segments 37 and 38 extending on opposite sides of shaft 11a.

Hub 14a has journalled therein a hollow shaft 40 on the end of which is mounted control handle 17a. Internally of shaft 40 is rotatively mounted shaft 41 which at one end extends through handle 17a and to which is connected handle 16a. At its opposite end shaft 41 is formed with a gear segment 42 meshing with gear segment 38 carried by pulley 13a. Shaft 40 likewise carries a gear segment 43 meshing with gear segment 37 of pulley 12a.

From the means just described, it results that axial rotation of handle 16a will operate shaft 41, gear segments 42—38, pulley 13a and cables 25a. Axial rotations of handle 17a will actuate similarly shaft 40, gears 43—37, pulley 12a and cables 24a. Rotation of both handle segments together activates both sets of connections. These adjustments are performed without affecting the adjustment of the third control represented by crank 35 and shaft 36.

It is important that the relative setting of the handle 16a—17a remain fixed unless intentionally altered by axial manipulation. For example, if as in Fig. 1 these controls are presumed to be connected to the throttles of dual engines requiring synchronization, the handle segments, once adjusted, should remain in the same relative position until changed intentionally, and should not be capable of separate accidental movement resulting from vibration or the like.

Suitable means to this end are shown in Figs. 3 and 4. Circularly arranged in the butt of handle 17a are a plurality of half-holes or cups 50, while on the opposing end face of handle 16a are provided complementary bores which contain spring-urged balls 51. Preferably the number of holes 50 are unequal to the balls 51.

(In Fig. 4, there are shown nine holes and eight balls, each equidistantly spaced.)

This permits of a finer adjustment than if the balls and holes were equal and hence would all engage simultaneously.

In operation, referring once again to Fig. 1, it will be seen that axial rotation of the dual handles 16—17 permits selective or simultaneous adjustment of the throttle speeds of two motors without regard to change in collective pitch since the adjustment of cable 30 is not affected unless lever 15 is moved on the axis of shaft 11. When, however, lever 15 is moved, all three adjustments are altered simultaneously. The device thus permits a pilot to adjust three separate controls by a single control stick. Furthermore, once the motors are synchronized and set at the proper initial speed, the pilot does not need to coordinate through separate controls the proper relation between increases or decreases in throttle and collective pitch, since this is simultaneously accomplished by simply moving lever 15.

Particularly in aircraft and helicopter designs the pilot is generally burdened by a multiplicity of controls which he must handle. The invention centralizes the controls of three important functions in a single implement which is simple to operate with one hand.

In the appended claims, the term "control element" is employed, which should be taken to mean a mechanism capable of adjusting another mechanism, the latter being, in the example given, either the cyclic pitch control of a helicopter and dual engines thereof, or other mechanisms requiring equivalent adjustments.

What is claimed is:

1. A control mechanism including, in combination, support means carrying a rotatable shaft, a control element connected to said shaft, a control stick connected to said shaft for rotation thereof to vary the adjustment of said control element, said control stick also carrying a pair of control handles mounted thereon for rotation around the axis of said stick, each handle of said pair being connected by spaced separate gear means to other second and third control elements requiring separate adjustment relative to each other and simultaneous adjustment with said first-mentioned control element, said spaced separate gear means each including a gear connected to each of said handles meshing with another gear journalled on said rotatable shaft for independent movement relative thereto, the latter gears each being independently connected to said other control elements, rotation of either handle serving to adjust only the one of said second or third other control elements to which the handle is connected, movement of said control stick causing simultaneous adjustment of all three control elements, said control handles being concentrically mounted on said control stick adjacent to each other, spaced apart by intervening means preventing accidental movement.

2. A control mechanism including, in combination, support means carrying a rotatable shaft, a control element connected to said shaft, a control stick connected to said shaft for rotation thereof to vary the adjustment of said control element, said control stick consisting of a hollow shaft carrying a control handle and an internal shaft carrying a second control handle, said hollow shaft and said internal shaft being journalled for rotation in a hub carried by said rotatable shaft, a pair of pulleys mounted on said rotatable shaft for independent movement relative thereto, each pulley being connected to other control elements, each of said pulleys carrying a gear, said hollow shaft carrying a gear meshing with one of said pulley gears, said internal shaft carrying a gear meshing with the other of said pulley gears, movement of said control stick causing simultaneous movement of said pulleys along with said first-mentioned control element, said control handles being concentrically mounted on said control stick closely adjacent to each other, spaced apart by intervening means preventing accidental movement.

3. A control mechanism including, in combination, support means carrying a rotatable shaft, a control element connected to said shaft, a control stick connected to said shaft for rotation thereof to vary the adjustment of said control element, said control stick also carrying a pair of control handles mounted thereon for rotation around the axis of said stick, each handle of said pair being connected by spaced separate gear means to other second and third control elements requiring separate adjustment relative to each other and simultaneous adjustment with said first-mentioned control element, said spaced separate gear means each including a gear connected to each of said handles meshing with another gear journalled on said rotatable shaft for independent movement relative thereto, said latter gears each being independently connected to said other control elements, rotation of either handle serving to adjust only the one of said second or third other control elements to which the handle is connected, movement of said control stick causing simultaneous adjustment of all three control elements, said control handles being concentrically mounted on said control stick adjacent to each other, and wherein means are interposed between the opposed ends of said handles to prevent accidental movement of said handles relative to each other, said interposed means consisting of male elements carried by one of said handle ends and female elements carried by the opposed handle end.

4. A control mechanism including, in combination, support means carrying a rotatable shaft, a control element connected to said shaft, a control stick connected to said shaft for rotation thereof to vary the adjustment of said control element, said control stick also carrying a pair of control handles mounted thereon for rotation around the axis of said stick, each handle of said pair being connected by spaced separate gear means to other second and third control elements requiring separate adjustment relative to each other and simultaneous adjustment with said first-mentioned control element, said spaced separate gear means each including a gear connected to each of said handles meshing with another gear journalled on said rotatable shaft for independent movement relative thereto, the latter gears each being independently connected to said other control elements, rotation of either handle serving to adjust only the one of said second or third other control elements to which the handle is connected, movement of said control stick causing simultaneous adjustment of all three control elements, said control handles being concentrically mounted on said control stick adjacent to each other, and wherein means are interposed between the opposed ends of said handles to prevent accidental movement of said handles relative to each other, said interposed means consisting of male elements carried by one of said handle ends and female elements carried by the opposed handle end, the male and female elements being concentrically spaced around the axes of said handles to an equal degree, the male and female elements respectively being spaced from each other to an unequal degree.

5. A control mechanism including, in combination, support means carrying a rotatable shaft, said shaft being formed with a hollow hub formed transversely to the axis of said shaft, a control element connected to said rotatable shaft, a control stick carried in said hub, said control stick consisting of a hollow shaft carrying a control handle and an internal shaft carrying a second control handle, said internal shaft extending through said hollow hub, a pair of pulleys mounted on said rotatable shaft at opposite sides of said hollow hub for independent movement relative to said rotatable shaft, each of said pulleys being connected to other control elements, one of said pulleys having an operating gear meshing with another gear mounted on said hollow shaft between said hub and said control handles, the other of said pulleys having an operating gear meshing with another gear connected to the internal shaft end extending through said hollow hub, movement of said control stick transverse to the axis of said rotatable shaft simultaneously varying the adjustment of all three control elements, rotation of said control handles selectively and independently varying the adjustment of the control elements connected to said pulleys.

References Cited in the file of this patent

UNITED STATES PATENTS

| | | |
|---|---|---|
| 1,363,794 | Kirkham et al. | Dec. 28, 1920 |
| 1,807,848 | Kollinek | June 2, 1931 |
| 2,235,013 | De Pew | Mar. 18, 1941 |
| 2,313,768 | Putt | Mar. 16, 1943 |
| 2,407,322 | Morrison | Sept. 10, 1946 |
| 2,439,393 | Kerr | Apr. 13, 1948 |
| 2,618,447 | Lecarme | Nov. 18, 1952 |